US011125537B2

(12) United States Patent
Riden

(10) Patent No.: US 11,125,537 B2
(45) Date of Patent: Sep. 21, 2021

(54) SYSTEMS AND METHODS FOR ISOLATING OPEN AREAS IN ENCLOSED SPACES AGAINST TRIGGERING EVENTS, ACTIVE SHOOTERS, GUNSHOTS, EXPLOSIVES AND OTHER ACTIVE THREATS

(71) Applicant: Vincent Andrew Riden, Las Vegas, NV (US)

(72) Inventor: Vincent Andrew Riden, Las Vegas, NV (US)

( * ) Notice: Subject to any disclaimer, the term of this patent is extended or adjusted under 35 U.S.C. 154(b) by 0 days.

(21) Appl. No.: 16/746,804

(22) Filed: Jan. 17, 2020

(65) Prior Publication Data

US 2020/0232767 A1 Jul. 23, 2020

Related U.S. Application Data

(60) Provisional application No. 62/794,540, filed on Jan. 18, 2019.

(51) Int. Cl.
*F41H 5/24* (2006.01)
*H04W 4/90* (2018.01)
(Continued)

(52) U.S. Cl.
CPC ............... *F41H 5/24* (2013.01); *G08B 7/06* (2013.01); *G08B 21/10* (2013.01); *G08B 25/10* (2013.01); *H04W 4/90* (2018.02); *F41H 5/026* (2013.01)

(58) Field of Classification Search
CPC . F41H 5/24; F41H 5/026; H04W 4/90; G08B 7/06; G08B 21/10; G08B 25/10;
(Continued)

(56) References Cited

U.S. PATENT DOCUMENTS

| 6,412,391 B1 * | 7/2002 | Stevens | F41H 5/007 89/36.17 |
| 2006/0144530 A1 * | 7/2006 | Nagare | E06B 9/581 160/271 |

(Continued)

*Primary Examiner* — Bret Hayes
(74) *Attorney, Agent, or Firm* — TannerIP PLLC; Daniel A. Tanner, III; James E Golladay, II

(57) ABSTRACT

A system and method are provided for facilitating automated and manual segregation of internal areas within a structure, particularly in response to active shooter warnings, or other triggering events. Embodiments may provide automated systems and methods, products and product components to facilitate simplified and automated (1) deployment of mechanized safety and/or security (bulletproof) curtains, including certain safety curtains comprising, or otherwise formed of, replaceable bulletproof and/or other penetration-resistant materials, and/or (2) actuation of mechanized safety and/or security (bulletproof) doors, to effectively segregate open areas and hallways in buildings. Exemplary embodiments may: (a) limit lines of sight of a perpetrator; (b) interdict bullet flight paths; (c) restrict or eliminate a perpetrator's freedom movement; (d) confine areas of detected explosive ordnance detonations or dispersal of contaminants; (e) provide a means of trapping/isolating a perpetrator; and/or (f) provide local safe havens in active shooter, gunfire, explosive detonation, contaminant dispersal, and like threat scenarios/situations.

12 Claims, 8 Drawing Sheets

(51) Int. Cl.
*G08B 21/10* (2006.01)
*G08B 7/06* (2006.01)
*G08B 25/10* (2006.01)
*F41H 5/02* (2006.01)

(58) Field of Classification Search
CPC .... E06B 9/13; E06B 9/17; E06B 2009/17053; E06B 9/70; E06B 9/72
See application file for complete search history.

(56) References Cited

U.S. PATENT DOCUMENTS

2015/0059990 A1* 3/2015 Adrain .................. F41H 5/0457
160/10
2017/0211315 A1* 7/2017 Fleischman ............. E06B 9/174

* cited by examiner ized.
SYSTEMS AND METHODS FOR ISOLATING OPEN AREAS IN ENCLOSED SPACES AGAINST TRIGGERING EVENTS, ACTIVE SHOOTERS, GUNSHOTS, EXPLOSIVES AND OTHER ACTIVE THREATS This application claims the benefit of U.S. Provisional Patent Application No. 62/794,540, entitled "Systems and Methods for Isolating Open Areas in Enclosed Spaces Against Active Shooters, Gunshots and Other Active Threats," filed Jan. 18, 2019, the disclosure of which is hereby incorporated by reference herein in its entirety.

BACKGROUND

1. Field of the Disclosure

This disclosure is directed to exemplary embodiments of automated systems, methods, techniques, processes, products and product components that facilitate simplified and automated (1) deployment of mechanized safety and/or security (bulletproof) curtains, including certain safety curtains comprising, or otherwise formed of, replaceable bulletproof and/or other penetration-resistant materials, and/or (2) actuation of mechanized safety and/or security (bulletproof) doors, to effectively segregate open areas and hallways in buildings. Exemplary embodiments may: (a) limit lines of sight of a perpetrator, (b) interdict bullet flight paths; (c) restrict or eliminate a perpetrator's freedom of movement; (d) confine areas of detected explosive ordnance detonations or dispersal of contaminants; (e) provide a means of trapping a perpetrator, so as to provide local safe havens in active shooter, gunfire, explosive ordnance detonation, contaminant dispersal, and other like threat scenarios/situations.

2. Description of the Related Art

Active shooter incidents are heinous, with a particular level of heinous atrocity being in the nature of what have come to be known as K12 shootings. An example of these is Sandy Hook Elementary, on Dec. 14, 2012, in Newtown, Conn., which left twenty-eight small children dead. This could be classified as the worst of such incidents. More recently, on Feb. 14, 2018, a gunman opened fire at Marjory Stoneman Douglas High School in Parkland, Fla. The tragic result of this incident left seventeen people dead, and seventeen injured.

In the aftermath of what was the deadliest mass shooting at a high school in United States history, surpassing the 1999 Columbine High School massacre, and at a period of heightened public support for gun control following recent mass shootings in Las Vegas, Nev., at a Country Music Festival, and at a Sutherland Springs, Tex. church, respectively in October and November 2017, public anger and frustration boiled over locally regarding the issues of mass shootings and gun violence, and the movement brought about a resurgence in the national dialogue in the U.S. regarding these topics. Demands for legislative action regarding affirmative steps to prevent gun violence reached a fevered pitch. On Mar. 9, 2018, the then Governor of Florida signed a bill that raised the minimum age for buying rifles in Florida from 18 to 21. The legislation also established waiting periods and background checks for gun buyers. The law also allowed for the arming of teachers, on the condition that those teachers were properly trained, and allowed for the hiring of school police. Efforts were included to ban so-called "bump stocks," and to prohibit some potentially violent or mentally unstable persons from possessing guns. As the fevered pitch of the local response diminished, some of the measures were scrutinized, and came under attack for their potential non-constitutionality.

Calendar year 2019 saw additional potential and actual mass shootings that confirmed that the need to find better ways to aggressively respond to active shooter scenarios that were not limited to schools. On Dec. 6, 2019, for example, an active shooter killed three Navy personnel on Naval Air Station Pensacola, Fla. As is often the response, the first reaction was to identify what went wrong. Depending on the political will of the locality, demand for legislative action in restricting access to firearms is often a first, and loudest, response. That response then often comes under the same sort of scrutiny outlined above regarding constitutionality of proposed measures intended to eliminate these incidents, particularly as the actual efficacy of such plans is scrutinized.

What generally remains overlooked in attempting to find innovative ways to address steady, if not increasing, numbers of threat scenarios (including those that reach beyond simply the active shooter scenario that has become all too commonplace) is whether, instead of focusing on the guns (or other potentially harmful instrumentalities), there may be particular infrastructure modifications that could be made to aid in substantially reducing, or even eliminating, the threats posed by active shooters, and other individuals intending to do harm, in a large indoor spaces. The characteristic of certain of these events occurring in large, virtually unimpeded indoor spaces is an unfortunate characteristic that the Parkland incident shared with the Columbine incident, and with several other incidents, if not all.

In 1971, criminologist C. Ray Jeffries wrote a book Crime Prevention Through Environmental Design, commenting on crime and the effects of crime on neighborhoods, particularly in inner cities, at a time when crime reduction was sorely needed. Decades later, the concept is known as CPTED, which is defined as a multi-disciplinary approach to deterring criminal behavior through environmental design. In essence, while the concept has been "mainstreamed" by architectural designers and developers, and within the security and security design industry, the embodiments of the concept embedded into building design development processes have proven predictably limited, and have fallen far short of the need for contemporary active shooter interdiction systems, certain physical design elements, and physical security design techniques employing contemporary bulletproof and/or bullet resistant materials applied to architectural interior finish selections needed to protect public spaces where there should be a reasonable expectation of safety.

SUMMARY OF DISCLOSED EMBODIMENTS

In view of the above ongoing shortfalls, and particularly the devastating potential for injury and/or loss of life posed by active shooter, and certain other, threat scenarios, as typified by the examples catalogued above, it may be advantageous to incorporate unique, contemporary, interdiction systems, and associated methods, when no other solutions currently exist, that exceed the broad concept of CPTED, and environmentally adapt that concept to these scenarios and other like, emergent dangerous situations in areas where the public at large may have a reasonable expectation of safety.

It may be advantageous to address current shortfalls in enclosed-space environmental design, in that concepts such as CPTED generally do not provide any systems or methodologies for active shooter or other threat mitigation or interdiction, through the employment of unique structural, or infrastructure, design elements and/or systems. An objective of the inventive concepts according to this disclosure may be to incorporate certain intelligent design into building structures to effectively provide a means by which to segregate hallways and other open areas into manageable zones through the automatic deployment of particularly designed dividers and the separate or coincident actuation of reinforced doors.

Because active shooters are an infrequent, and a comparatively recent phenomenon, not a lot of thought has generally been applied, well after the CPTED concept was established, to adapting the concept to mass and active shooting scenarios, in general, and in enclosed large-area spaces which tend to provide active shooters with freedom of movement and extended lines of sight, with the commensurate opportunity for unimpeded bullet travel within these wide-open internal spaces, often increasing the potential for larger numbers of individuals to be injured or killed by even the weakest shooter.

Exemplary embodiments of the disclosed systems and methods then provide a fully-developed contemporary design concept that may include, or otherwise establish, an internal area segregation scheme within a building for active shooter (and potentially other threat) interdiction, to suppress and/or eliminate the freedom of movement and/or obstruct the line of sight of an active shooter or other threat perpetrator, and provide bullet flight cessation design elements and functions, particularly in employing an ability to quickly segregate large indoor open areas into a series of safe zones in which individuals that may be targeted by an active shooter or other threat perpetrator may be effectively isolated from the active shooter or other threat perpetrator.

Exemplary embodiments may have a coincident effect of providing additional focus on elements of related subject matter that need to be contemporaneously addressed with the application of the disclosed systems and methods. These may include, for example: the birth of the contemporary active shooter, born out of the lack of addressing dysfunctional social constructs that may exist in public schools, and public school communities; establishing avenues for social change; providing legislative development to more specifically address, within constitutional bounds, the devastating effects of the threat scenarios that the disclosed systems and methods are intended to specifically address; and providing concurrent opportunities for applying related concepts in the hardening of school buses and other mass transit vehicles as these may emerge as the new soft targets. A focus on the mass transit elements may naturally grow from application of the disclosed systems and methods within open spaces in buildings and structures, as the proper application of the disclosed concepts will likely harden certain buildings and structures, like schools, churches, malls, federal, municipal and commercial office buildings and the like, to a point that the mass transit elements may become the comparatively easier targets for a determined active shooter or other threat perpetrator.

Exemplary embodiments may particularly address active shooter scenarios, and may further particularly address the fact that schools and churches may be considered, for example, comparatively inviting low effort, easy access, high victim yield, soft targets in which the active shooter may act with impunity anticipating a low expectation of any individuals in these structures returning fire.

Exemplary embodiments may address a particular shortfall in current emergency response systems in that, for example, the manual activation of a fire alarm pull stations, or as in the Parkland attack, fire alarms were actually activated based on the detection of the cordite from the weapon being fired inside the building. The result of this intentional, or inadvertent "tripping" of the fire alarm system within the high school was that it served to evacuate students into hallways, and potentially into the active shooter's sights, thereby possibly increasing the number of victims and certainly potential victims.

Exemplary embodiments may address the danger posed by localized weapons of mass destruction. In this regard, and in the context of this disclosure, any semi-automatic rifle or pistol operating on center fire ammunition is reasonably considered, and addressed here as, a weapon of mass destruction principally due to the exceedingly high death and injury rates that these weapons are capable of producing when addressing or interdicting gunfire. Additionally, certain explosive detonations and dispersal of contaminants, often in a form of liquid or aerosol chemical agents may be addressed using elements of the disclosed interdiction schemes and devices.

Exemplary embodiments may provide automatically deployable (or closable) curtains substantially consisting of selective ballistic-resistant material for dividing large open areas into a number of smaller containment cells within those large open areas.

Exemplary embodiments may provide for automatic closing of hallway, classroom, office or other doors (particularly such doors including embedded ballistic materials), either by themselves, or in combination with the deployment of the ballistic curtains in order to further restrict personnel traffic flow through typically large open areas.

Exemplary embodiments may provide a resultant capacity by which, individually or in combinations, exemplary embodiments of the disclosed systems and methods may effectively isolate active shooters, and other threat perpetrators, in a manner to limit the potential for increasing harm to individuals who find themselves unfortunately placed in harm's way.

Exemplary embodiments may provide automated response to detected gunfire, other detected explosive detonations, or other detected dispersals of contaminants in order that the threats be detected, localized, confirmed and/or isolated in a manner that restricts the threat while maintaining adequate avenues of escape in directions away from the detected, localized, confirmed and/or isolated threats.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for facilitating simplified and automated (1) deployment of mechanized safety and/or security (bulletproof) curtains, including certain safety curtains comprising, or otherwise formed of, replaceable bulletproof and/or other penetration-resistant materials, and/or (2) actuation of mechanized safety and/or security (bulletproof) doors, to effectively segregate open areas and hallways in buildings to provide local safe havens in active shooter, gunfire, explosive ordnance detonation, contaminant dispersal, and other like threat scenarios/situations, will be described, in detail, with reference to the following drawings, in which.

DETAILED DESCRIPTION OF EMBODIMENTS

Figure 1:
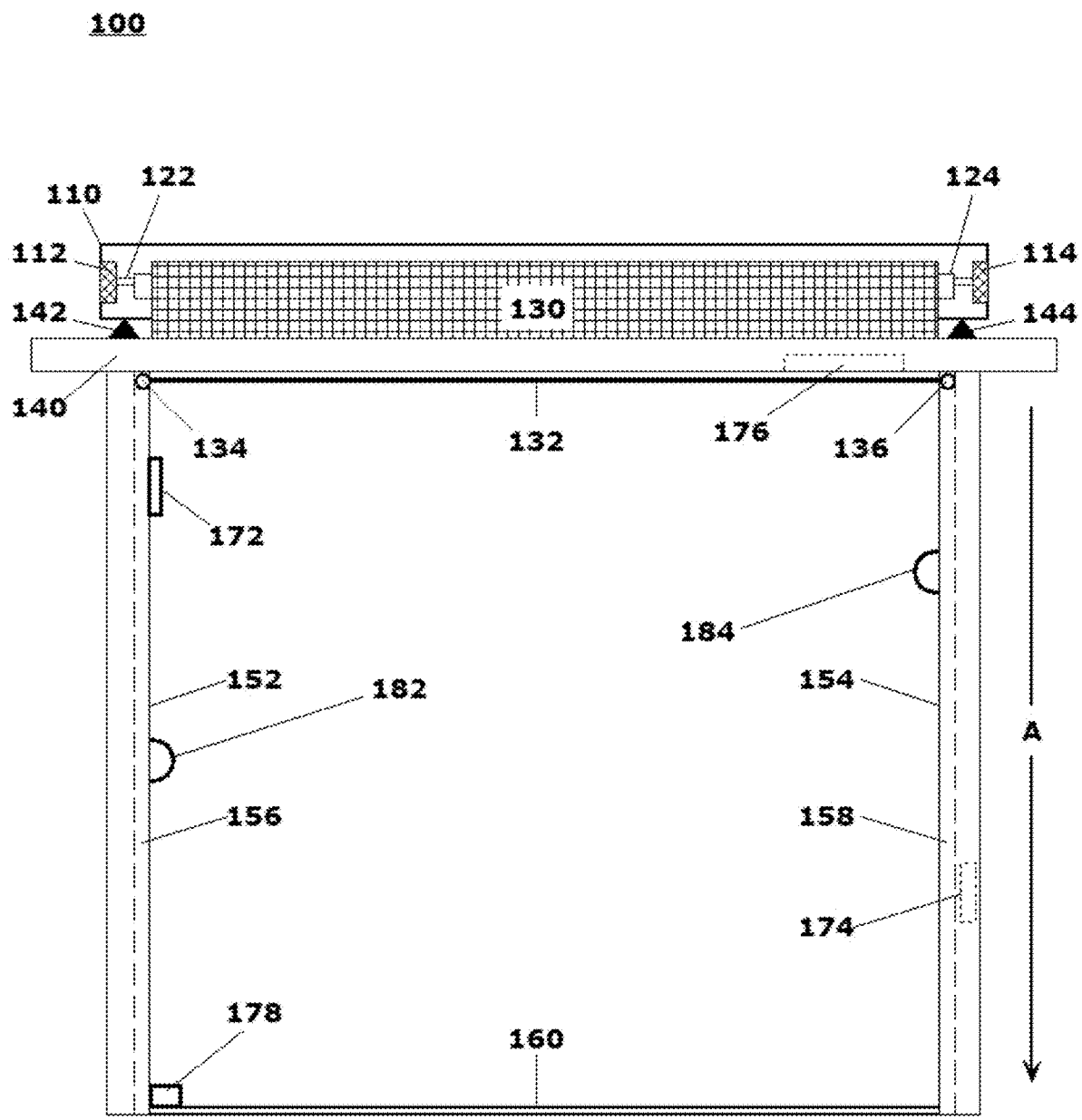
FIG. 1 illustrates a schematic diagram of a first (open) view of a first exemplary embodiment of elements of an area segregation or active shooter interdiction system according to this disclosure.

The disclosed exemplary embodiments of automated systems, methods, techniques, processes, products and product components may address the shortfall in the prior art by facilitating simplified and automated (1) deployment of mechanized safety and/or security (bulletproof) curtains, including certain safety curtains comprising, or otherwise formed of, replaceable bulletproof and/or other penetration-resistant materials, and/or (2) actuation of mechanized safety and/or security (bulletproof) doors, to effectively segregate open areas and hallways in buildings. Exemplary embodiments may: (a) limit lines of sight of a perpetrator; (b) interdict bullet flight paths; (c) restrict or eliminate a perpetrator's freedom of movement; (d) confine areas of detected explosive ordnance detonations or dispersal of contaminants; (e) provide a means of trapping a perpetrator; and/or (f) provide local safe havens in active shooter, random gunfire, explosive ordnance detonation, contaminant dispersal, and other like threat scenarios/situations.

The systems and methods for localized space segregation or isolation according to this disclosure may be directed at effectively and selectively, causing the cessation of bullet flight and/or the obstruction of an active shooter's line of sight, and at removing or severely restricting the freedom of movement of a perpetrator, in active shooter scenarios. This disclosure will generally refer to these specific utilities for the disclosed systems, methods, processes, techniques and/or schemes of movement. Exemplary embodiments described and depicted in this disclosure should not be interpreted, however, as being specifically limited to any particular configuration of a system of integrated electromechanical components, sensor elements/arrays, and/or decision-making programs and/or methodologies to accomplish the above-described functions. Any particular configuration of an automated bulletproof curtain, panel, door or other obstruction deployment system that may benefit from the strategic concepts outlined according to the exemplary embodiments discussed in this disclosure is contemplated as being included within the scope of this inventive concept. In other words, it should be recognized that any advantageous use of schemes for segregating hallways and large areas in buildings, interdicting shooter sightlines and/or bullet line of flight, limiting damage from small explosives detonation or contaminant dispersal, and/or creating a mantrap by employing more than one device to isolate the threat away from potential victims, that may employ devices and/or methods such as those presented in this disclosure is contemplated as being included within the scope of the disclosed exemplary systems and methods.

The disclosed systems and methods will be described as being particularly adaptable for use in interrupting and/or interdicting active shooter scenarios in typical public-school and office building layouts. This description, and the associated references, are intended to provide a particular real-world use case in which the systems and methods according to this disclosure may be particularly beneficially adapted for use. These references are intended to be illustrative only and should not be considered as limiting the disclosed systems and methods to any particular embodiment, application, operational scenario or use case. Generic reference will be made to comparatively safer open-space interdiction scenarios for interrupting shooter sightlines and bullet lines of flight to be illustrative of the tremendous advantages in safety and security that may be achieved through full implementation of the disclosed schemes in comparatively large spaces within buildings and other structures.

The disclosed exemplary systems and methods may include all or some of the following elements to provide exemplary space segregating systems, or an exemplary active shooter interdiction system. In embodiments, the disclosed systems, methods, techniques, processes, products and product components may, when installed in a building, provide a seamless, invisible building hardening through the use of complementary architectural design features focusing on the physical attributes of a prospective building layout during the design and construction phases of new construction, or through intelligent retrofit of existing building structures with the disclosed component systems. When accompanying the disclosed systems, building safety design principles according to the disclosed schemes may gain additional benefit from:

Proper bullet resistant and/or bullet proof building materials installed in particular areas;
   Hardened, bullet resistant/bulletproof doors and hardware for classrooms, exterior entryways, and potentially through random placement in long hallways and in other areas where doors may prove particularly effective;
   Bullet resistant/bulletproof windows and doors; and
   Bullet proof wall paneling along hallway walls to protect people in classrooms or offices adjacent to communicating hallways.

The above-listed structural and architectural elements may complement an open area segregation scheme or an active shooter interdiction system, providing among other things a "bullet flight cessation" benefit, and being comprised substantially of a ceiling height mounted, recessed or surface mounted enclosure, containing a high-speed bulletproof fabric screen deployment system, which may be supplemented by an intelligent design in the placement of automated bulletproof doors throughout an internal building environment. When actuated, the ceiling height mounted systems, for example, may rapidly deploy from overhead a bulletproof fabric screen to extend spanwise across a hallway, downward from the ceiling to the floor, in a manner similar to a fire door, to mitigate bullet flight and to interrupt a shooter's line of sight down a hallway, or within a large open space. When two of these exemplary systems are activated near each other, they may also create a mantrap, trapping the active shooter or other perpetrator between screens and isolated away from many, if not all, potential victims.

Exemplary embodiments of the disclosed isolation systems may be activated by any one of a number of Commercial-Off-The-Shelf ("COTS") sensors, including, but not limited to, network/Internet Protocol connection (wired or wireless), software activation, serial communications, hard-wired relay(s), local or remote pushbutton(s), remote control, gunshot/explosives microphones, a gunfire/explosive locator system or a gunshot/explosive detection system. In embodiments, a sensor array may detect and convey the location of gunfire or other weapon fire using acoustic, optical, or potentially other types of sensors, as well as combinations of such sensors. In embodiments, these sensor arrays may be simplified versions of those more generally used by law enforcement, security, military and businesses to identify a source and, in certain use cases, a direction of gunfire and/or the type of weapon fired. Unlike the more general systems, while the disclosed schemes may incorporate certain processing components to limit false positives, there may be little need for a user-interface with a display unit that displays the gunfire alerts. Rather, one or more of the disclosed active shooter interdiction systems (when multiple ones of such systems are installed in a structure), may be individually activated based on detection and localization of a triggering event, including, but not limited to a gunshot, an explosive detection or the like.

Additionally, separately-provided interactive accessories and support subsystems and components like, ceiling-mounted compressed air smoke screen systems may be provided to enhance shooter disorientation by providing, within this system of systems, temporary smoke screens to obstruct vision further down the hall. In embodiments, compressed air canisters may be refillable. LED downlighting to the floor and/or adjacent wall, or lines painted on the floor and/or wall, may be provided to indicate the presence of the system installed overhead so bystanders are not loitering under the system, thereby creating a safe "No-Standing" zone directly underneath these systems, when installed.

In embodiments, cooperating locking systems may be provided such that once, for example, bullet resistant doors are closed, those doors are not easily opened, for example when a shooter recognizes that bullets may be ineffective in employment against such reinforced doors.

In embodiments, cooperating alarm systems may be included that provide audible and/or visible indications of threat detection, system activation and the like. Such alarm systems may also be usable to provide additional disorienting noise and/or blinding light to further enhance the safety of individuals in a vicinity in response to specific threats afforded by the exemplary systems and methods according to this disclosure. In embodiments, the disclosed area segregation or active shooter interdiction system may also, or otherwise, be separately integrated with a conventional intercom, or other mass notification, system connected with the gunshot microphones, video surveillance systems, fire alarms, software components, and social media warning systems, all of which may be integrated together to aid in and/or support repelling, deterring, detecting, isolating, trapping and/or reporting an active shooter or other perpetrator, thereby protecting innocent and vulnerable individuals, while seamlessly, effortlessly and continuously communicating with first responders, including law enforcement personnel.

Figure 2:
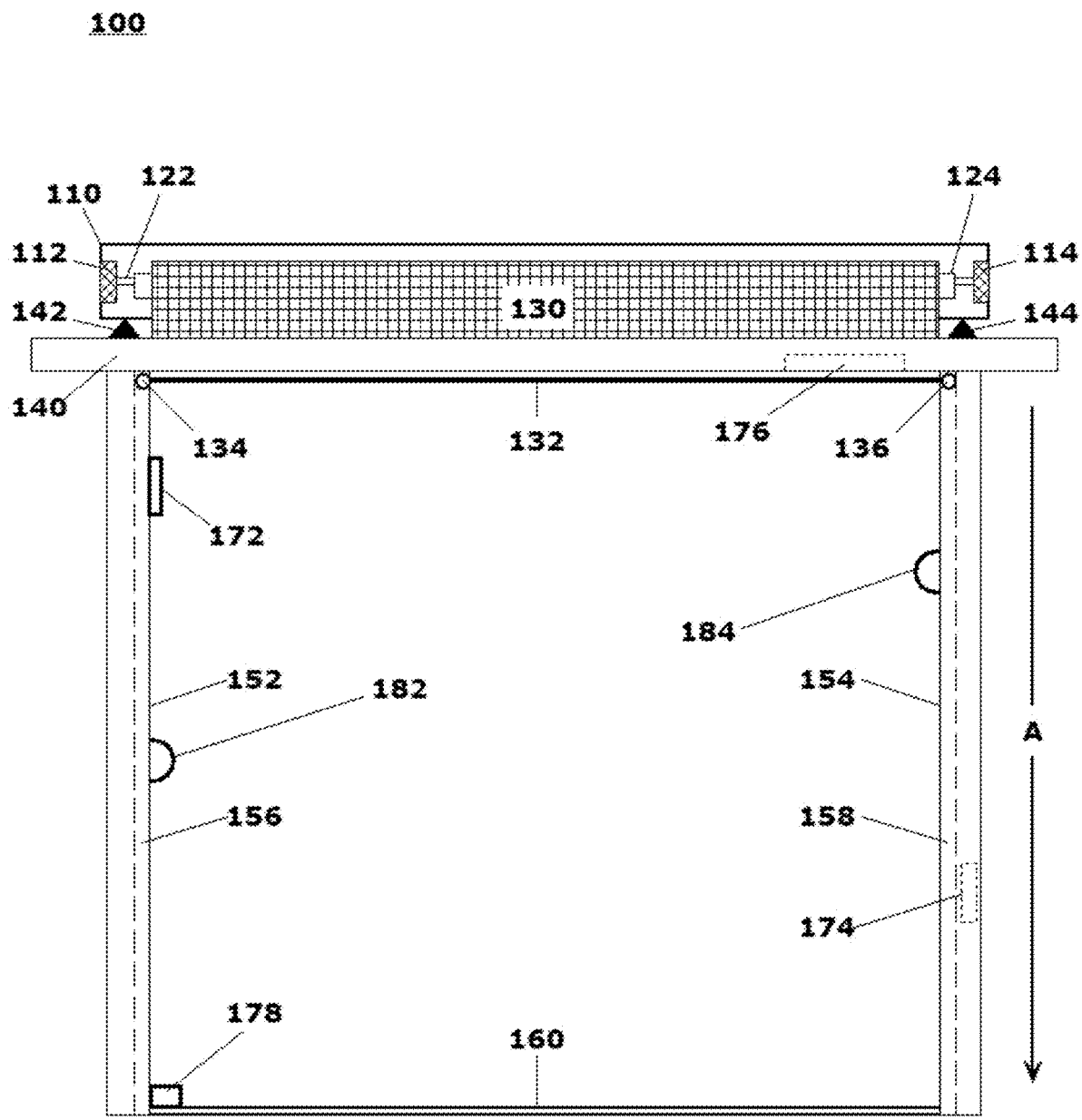
FIG. 2 illustrates a schematic diagram of a second (closed) view of the first exemplary embodiment of the elements of the area segregation or active shooter interdiction system shown in FIG. 1, and according to this disclosure.

FIG. 1 illustrates a schematic diagram of a first (open) view of a first exemplary embodiment of elements of an area segregation or active shooter interdiction system according to this disclosure. FIG. 2 illustrates a schematic diagram of a second (closed) view of the first exemplary embodiment of the elements of the area segregation or active shooter interdiction system shown in FIG. 1 and according to this disclosure. As shown in FIG. 1, the exemplary system may include an area segregation component in a form of a bulletproof curtain 130, shown in a retracted condition in FIG. 1.

The exemplary system 100 may include a housing 110 mounted, or recessed, in a building ceiling. The housing 110 may be mounted on a ceiling joist 140 directly, or with intervening mounting structures 142,144. The housing 110 may include mounting components 112,114 intended to rotatably support a central cylinder (or axle) 122 of the storage cylinder roller 124 to which a proximal end of the bulletproof curtain 130 is attached. One or both of the mounting components 112,114 may be in a form of, otherwise include, or be mechanically connected separately to, an electrically-energized motor or motor drive unit. Such motor drive unit may be employed to rapidly extend or retract the bulletproof curtain 130 shown in FIG. 1 spooled up on the storage cylinder roller 124 in the bulletproof curtain 130 retracted position. Separately, one or both of the mounting components 112, 114 may incorporate a brake unit that may be usable to maintain the bulletproof curtain 130 in its normally-retracted position, or to stop deployment suddenly once activated.

The housing 110 may be a recessed, ceiling mounted sheet metal enclosure, or other suitably configured structure mounted to intervening mounting structures 142,144 above the ceiling, positioned such that the housing 110 and the components it houses, including but not limited to in this example the bulletproof curtain 130, crosses the entire hallway, with only a slot through which the bulletproof curtain 130 may be extended, the slot being much like that used for a recessed video projection screen. A motor controller (as will be described in detail below), and electrical connections and control wiring may also be mounted above the ceiling. In this manner, the area segregation or active shooter interdiction system according to this disclosure may be largely non-detectable, even as a result of specific investigation by a would-be perpetrator.

A distal or free end of the bulletproof curtain 130 may be attached, spanwise or at intervals, to a weighted bar structure 132, or separately to individual weights placed at intervals span wise at the distal end of the bulletproof curtain 130. A weight of the weighted bar structure 132, or of the plurality of individual weights, may be selected to most effectively facilitate extension of the bulletproof curtain 130 from its retracted position (as shown in FIG. 1) to an extended position (as shown in FIG. 2).

It should be noted that the detail shown in FIG. 2 is modified from that shown in FIG. 1 in order to highlight only the difference in the positioning of the bulletproof curtain 130 in its extended position in FIG. 2. Such extension of the bulletproof curtain 130 may be facilitated through powered extension by one or more motor drive units being operated in an extend mode, as described above, or through simply disengaging a brake unit and allowing the weighted bar structure to substantially freefall pulling the bulletproof curtain 130 from the storage cylinder roller 124 as it falls in direction A by the action of gravity toward the floor 160.

One or both ends of the weighted bar structure 132 may include a fitting 134,136 that is formed and operated in a manner to cooperatively engage with one or more structures 156,158 recessed in, or mounted on, each wall component 152,154 that the bulletproof curtain 130, in an extended condition, spans between as it extends in direction A toward the floor 160. Separately, any suitable structure by which lateral edges of the bulletproof curtain 130 may be held in recesses 156,158 so as to substantially ensure complete span wise coverage of the open area is contemplated. The one or more structures 156,158 recessed in, or mounted on, each wall component 152,154, may be considered, for example, a track based vertical guide system to keep horizontal tension on the bulletproof curtain 130 at all times. The weighted bar structure 132 may be in a form of a solid, wide metal bottom rail that fits flush and tightly to the floor 160. Such a configuration mitigates a possibility that an active shooter will shoot at the bottom and along the wall line, limiting the damage inflicted, and substantially preventing breach by the active shooter attempting to pass under a bottom edge, or along a side edge, of the bulletproof curtain 130. The bottom rail should have enough mass to survive multiple hits from bullets, and to provide a tight seal to the floor 160 to prevent bullets squeezing under it.

Figure 2A:
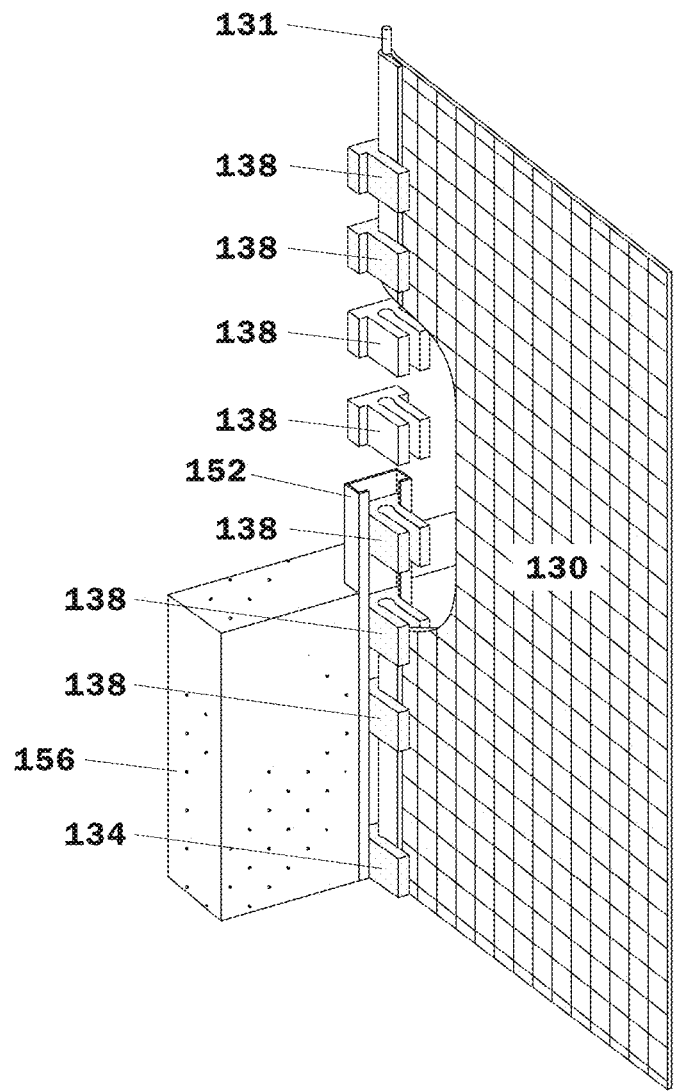
FIG. 2A illustrates details of the of the first exemplary embodiment of the elements of the area segregation or active shooter interdiction system shown in FIGS. 1 and 2, and according to this disclosure.

The bulletproof curtain 130 may be formed of a replaceable ballistic (or bullet resistant) screen material that attaches to the vertical wall mounted guide track system 156, 158 and across the bottom rail via, for example, a continuous clamp compression system (along the bottom and up the sides as appropriate) that permits replacing the screen, if necessary. In embodiments, at the vertical rails, a flexible cord 131 may be sewn into each lateral or vertical edge of the bulletproof curtain 130, then clamped at each of a plurality of trolleys 138 that may ride along, and may be driven by, a drive chain or toothed belt and rollers by the motor or motor drive unit. See FIG. 2A. The flexible cord 131 may be made to fit the diameter of the overall roll of material encased in the housing 110.

The weighted bar structure 132 at the bottom rail may comprise a multi-piece system, of which one may be a continuous metal strip, and the other may be the bottom rail itself. In embodiments, each may be machined with a ½ round recess, providing a round recess for a rod of the right diameter, with space permitting the screen to at least half wrap around the rod, with the metal strip bolted to the bottom rail via common thread bolts. The bolts may pass through the strip, into threaded holes in the bottom rail, providing a very high clamping force, clamping the replaceable screen material of the bulletproof curtain 130 and the rod to the bottom rail.

The replaceable screen material of the bulletproof curtain 130 may comprise one or more soft ballistics materials. Such a replaceable screen material may be available from a number of commercial manufacturers. The replaceable screen material may be laid up in a plurality of layers to form the bulletproof curtain 130. Using multiple layers, multiple composite material types, layering, a fill and or a padding layer, or an embedded wire mesh, may enhance the bulletproof nature of the bulletproof curtain 130 and support anti-stab technology, providing a suitable composite material screen for a bulletproof curtain 130 that will stop at least up to and including .50 caliber bullets. Such material composites are currently available on the U.S. commercial public markets.

Exemplary soft and hard ballistic materials are known and any suitable ballistic materials may be employed. Ballistic materials may be usable as the outer liner(s) of the weighted bar structure 132, and potentially, vertically along both sides of wall components, 152, 154, to provide protection against live fire rounds damage in an attempt to disable the active shooter interdiction system.

The exemplary system 100 may include one or more gunshot sensor components and/or sensor arrays 172,174, 176,178 that may be mounted locally on a face of a wall surface (see element 172), recessed in a wall structure (see element 174), in a ceiling structure (see element 176), and as a baseboard (or floor) mounted location (see element 178), or in any other advantageous, open, hidden, and/or beneficial mounting position, or combinations thereof. Such sensor components and/or sensor arrays may be otherwise remotely located from any one of the exemplary individual active shooter interdiction systems in order that gunshots and/or other explosive detonation events may be most advantageously detected and localized. As described generally above, the one or more gunshot sensor components and/or sensor arrays 172,174,176,178 may be in a form of known COTS sensors adaptable to such use cases. The one or more gunshot sensor components and/or sensor arrays 172,174,176, 178 may be employed in a manner that allows for detection and isolation of a gunshot or other explosive detonation event. The one or more gunshot sensor components and/or sensor arrays 172,174,176,178 may send a signal to a motor activating device (as will be described in more detail below) that may be usable to direct extension of the bulletproof curtain 132 from the storage cylinder roller 124 generally in the manner described above based on the signal.

It should be recognized that, when analyzing active shooter scenarios, one that most often emerges is a scenario in which the shooter moves freely throughout the building with nothing stopping the shooter, like an impenetrable barrier of some kind. Many years ago, the concept of "mantraps" was born. The exemplary system 100 with its deployment of a spanwise bulletproof curtain 130 anchored to a weighted bar structure 132, which is in turn movably anchored to each of the wall structures 152,154 that the bulletproof curtain 130 spans may update the general concept of a mantrap, and may be provided with additional features built in to particularly address the challenges presented by contemporary active shooter threats.

In the above manner, embodiments or elements of the exemplary system 100 may be usable to at least assist with minimizing a deadly active shooter's intent of victimizing as many people as possible. The exemplary system 100 takes earlier work centered around door locks of classrooms, and intermediate work directed to "wedge" devices, and "limiters" that fit on door closers, which, in theory, were or are intended to stop the shooter at the classroom door by making it physically impossible for the active shooter to breach, and provides a further line of defense to impede progress of an active shooter freely down a school corridor, for example. In essence, the exemplary system 100 may keep the active shooter from the classrooms themselves by serving itself as an active device that may barricade the active shooter in a "mantrap zone", so that the active shooter can be more efficiently localized and substantially neutralized until law enforcement arrives.

The presence of one or more exemplary systems 100 may aid in mitigating a common problem in which many existing (school) buildings have exterior exit doors that communicate directly into extensive main hallways that, in turn, communicate directly deeper into the building. This design flaw, intended to facilitate mass movement of the student body within the structure, and outside the structure is necessary, as the consequent effect of giving an active shooter a clear path with easy access to a large population of individuals within the structure as human targets. In instances where no classroom doors are bulletproof (generically, or as will be described in detail below with regard to other exemplary embodiments of the disclosed systems), or even bullet "resistant", the free access provided by unimpeded movement down long hallways leaves the building's occupants more vulnerable to attack. Even a fleeing active shooter can point a gun over the shoulder down the hallway into the crowd to take more victims en masse as the active shooter retreats and/or exits the structure. Current and legacy buildings are designed for freedom of movement, and not designed to mitigate an active shooter.

The systems and methods according to this disclosure are intended to address such an oversight in legacy building design. An objective of the exemplary system 100 may be to mitigate this scenario by stopping bullets fired down hallways, and confining the active shooter in as small a space as possible, without accidentally trapping innocent individuals with the active shooter. This may be accomplished with the exemplary system 100 as it provides, at high speed, a roll down barrier, in a form of a bulletproof curtain 130, mounted across a hallway, substantially in the manner shown in FIG. 2. As discussed generally above, and as will be described in greater detail below, the movement of the bulletproof curtain 130 in the exemplary system 100 may be triggered by the one or more gunshot sensor components and/or sensor arrays 172,174,176,178, creating a mantrap the exemplary system 100 may be activated to extend the bulletproof curtain 130. One or more exemplary systems 100 may be strategically placed based on pedestrian flow and door placement.

Also aiding in the effectiveness of a mantrap application employing one or more exemplary systems 100, may be inclusion of a one way ratcheting locking system controlling interaction of the fittings 134,136 formed at either end of the weighted bar structure 132, and operated in cooperative engagement with the one or more structures 156,158 recessed in, or mounted on, each wall component 152,154, that may lock the bulletproof curtain 130 bottom in a one-way direction the bulletproof curtain 130 is pulled by the weighted bar structure 132 down toward the floor 160 as the bulletproof curtain 130 unrolls when the storage cylinder roller 124 is actuated, or simply released. Such a ratcheting system may prohibit the bulletproof curtain 130 from moving up, locking it in any intermediate position if its extension in direction A is stopped for any reason, on its way to the fully down position at the floor 160, unless and until such locking systems may be unlocked allowing the bulletproof curtain 130 to be withdrawn.

The exemplary system 100 may include one or more separate manual user interfaces 182,184 mounted where generally convenient, but so as to avoid inadvertent actuation by any individual, particularly small children, or by any casual or inadvertent contact. Such manual user interfaces 182,184 may be usable to direct selective extension or retraction of the bulletproof curtain 130 when such extension or retraction may be desired and not controlled by the automated system based on sensor detection of a gunshot.

Figure 3:
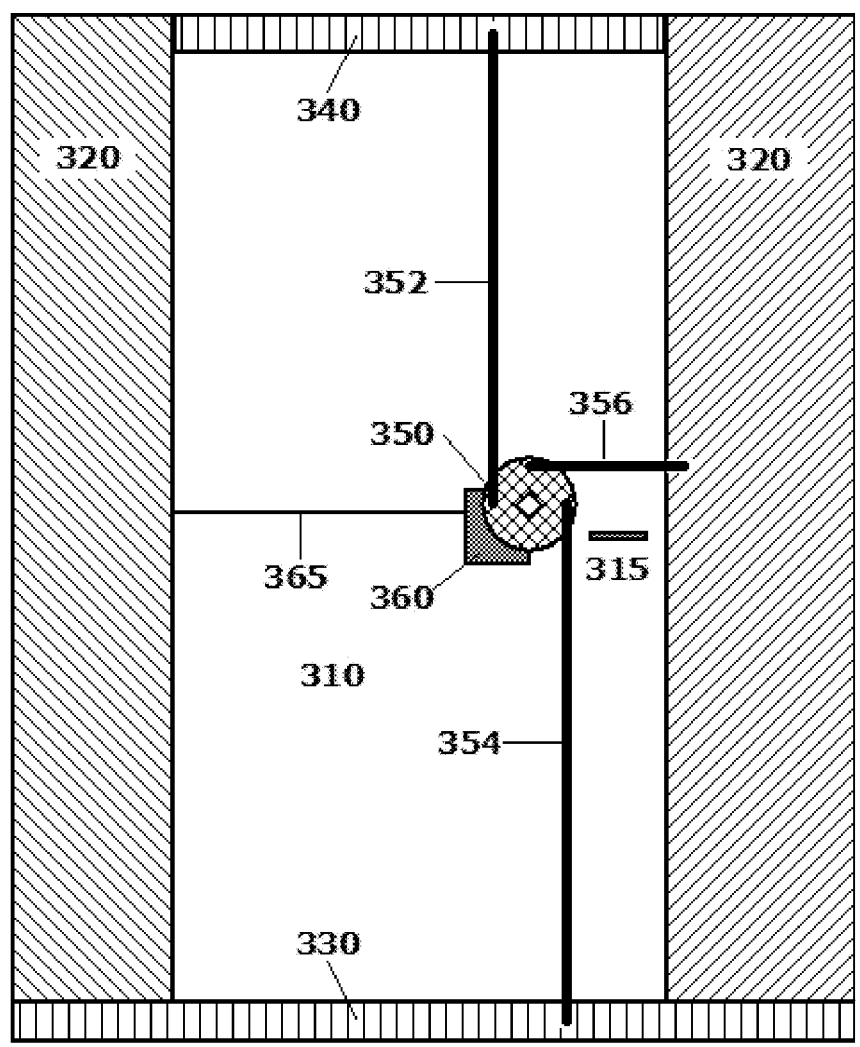
FIG. 3 illustrates a schematic diagram of a second exemplary embodiment of elements of an area segregation or active shooter interdiction system (single door) according to this disclosure.

FIG. 3 illustrates a schematic diagram of a second exemplary embodiment of elements of an area segregation active shooter interdiction system (single door 310) according to this disclosure. As shown in FIG. 3, the exemplary system 300 may comprise a specifically-modified door panel 310 between wall sections 320, each of which may incorporate substantially a standard doorjamb. The specifically-modified door panel 310 may include a conventional door sweep which may be lightly in contact with the floor 330. A header 340 may complete the door frame within which the specifically-modified door panel 310 may be mounted. The specifically-modified door panel 310 may include a standard doorhandle 315 which may or may not incorporate some manner of conventional door latching/locking mechanism.

The balance of the elements depicted in FIG. 3 may be mounted to either outer surface of the specifically-modified door panel 310 substantially in the manner shown. In preferred embodiments, however, the balance of the elements shown in FIG. 3 may be mounted substantially between outer veneer surfaces of the specifically-modified door panel 310. In this regard, the depiction in FIG. 3 may rightly be considered to represent a "cutaway" view of the specifically-modified door panel 310 to expose the balance of the elements as internal elements to the specifically-modified door panel 310.

The specifically-modified door panel 310 may include a rotating lock actuator plate 350 that may be particularly associated with an electric (or electronic) door lock device 360, which may receive either or both of electrical power and an actuation signal via one or more hard-wired connections, the wires making such connections being carried in, for example, a wire channel 365. The electric door lock device 360 may be of any known type of industrial door lock including, but not limited to, for example, a three point fox style police lock. When rotated into its locking position as shown in FIG. 3, each of extended locking plungers 352, 354, may be driven substantially vertically, and locking bolt 356 may be driven substantially horizontally, each to engage cooperating reinforced rod/bolt pocket receptacles in respectively the floor 330, the header 340, and/or the wall section 320.

In embodiments, the specifically-modified door panel 310 may incorporate ballistic materials in a manner that will be discussed in greater detail below with reference to, for example, FIG. 5, in order to substantially fortify the specifically-modified door panel 310 against gunshots, and certain explosive detonations. In operation, such specifically-modified door panels will generally be kept in a normally-closed, yet unlocked, condition. On detecting and localizing a triggering event, as will be discussed in greater detail below, an actuating signal may be received by the electric door lock device 360 to rotate the rotating lock actuator plate 350 in a manner that causes the extended locking plungers 352, 354 and the locking bolt 356 to engage the respective pockets/receptacles, thereby securely locking the specifically-modified door panel 310 in response to the actuating signal, which is, in turn responsive to detection of a triggering event, and may be, as indicated, transmitted via a hard-wired connection through the wire channel 365.

Figure 4:
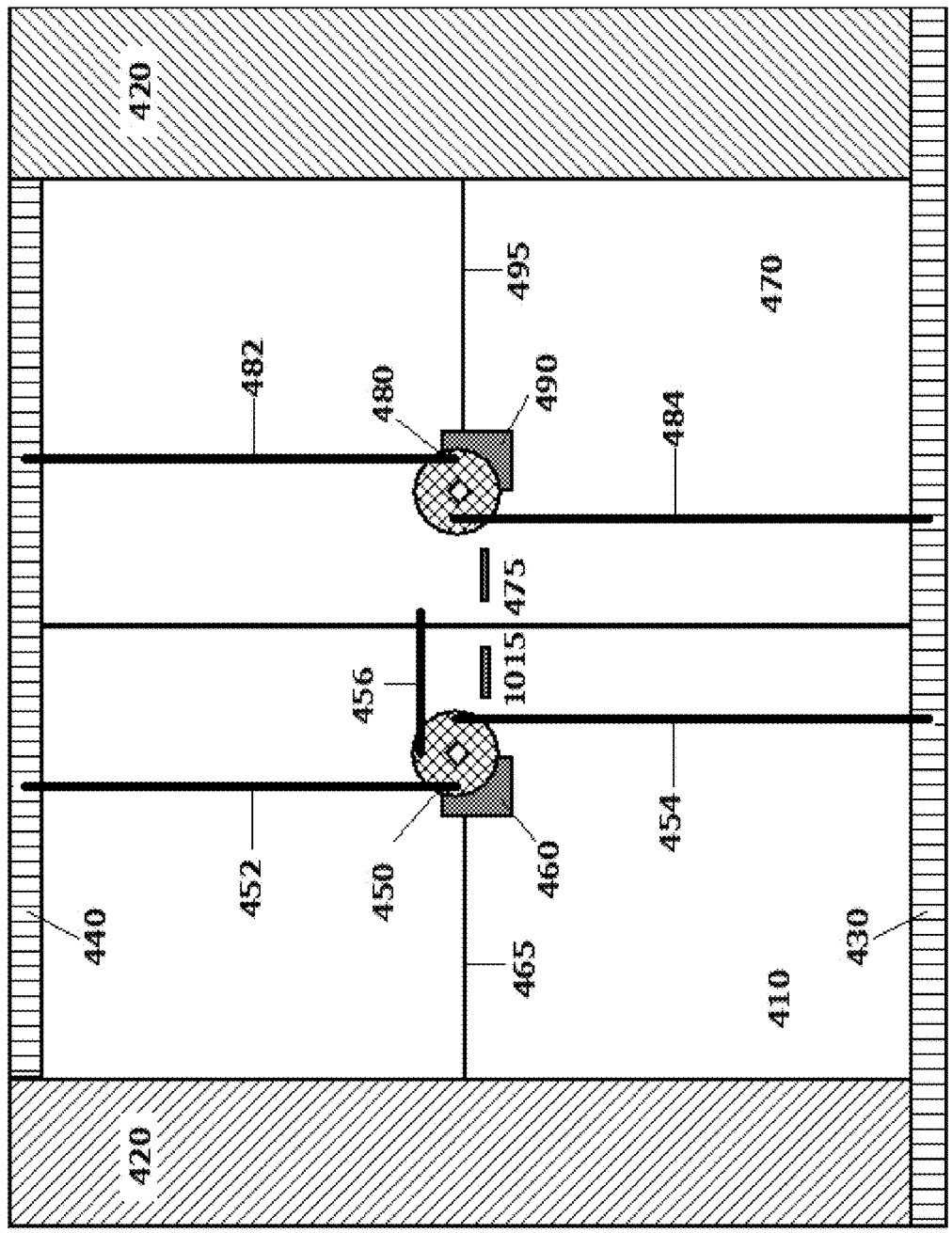
FIG. 4 illustrates a schematic diagram of a third exemplary embodiment of elements of an area segregation or active shooter interdiction system (double door) according to this disclosure.

FIG. 4 illustrates a schematic diagram of third exemplary embodiment of elements of an area segregation or active shooter interdiction system (double door 410,470) according to this disclosure. As shown in FIG. 4, the exemplary system 400 may essentially comprise a pair of specifically-modified door panels 410,470 between wall sections 420, each of which wall sections 420 may incorporate substantially a standard doorjamb. The pair of specifically-modified door panels 410,470 may each include a conventional door sweep, which may be lightly in contact with the floor 430. A header 440 may complete the door frame within which the pair of specifically-modified door panels 410,470 may be mounted to complete a double door installation. The pair of specifically-modified door panels 410,470 may each include a standard doorhandle 415,475, which may or may not incorporate some type of conventional door locking (or simply latching) mechanism.

The balance of the elements depicted in FIG. 4 may be mounted to either outer surface of each of the pair of the specifically-modified door panels 410, 470 substantially in the manner shown. In preferred embodiments, in the same manner as indicated in the description of FIG. 3 above, the balance of the elements shown in FIG. 4 may be mounted between outer veneer surfaces of the pair of specifically-modified door panels 410,470. In this regard, the depiction in FIG. 4 may likewise rightly be considered to represent a "cutaway" view of the pair of specifically-modified door panels 410, to expose the balance of the elements as internal elements.

The pair of specifically-modified door panels 410,470 may each include a rotating lock actuator plate 450,480 particularly associated each with an electric/electronic door lock device 460,490, which may receive either or both of electrical power and an actuation signal via a hardwired connection, the wires being respectively housed in wire channels 465,495. The respective electric door lock devices 460,490 may be, similar to the description above, of any known type of industrial door lock including, but not limited to, for example, a three point fox style police lock. When rotated into their locking positions as shown in FIG. 4, each of extended locking plungers 452,454, associated with specifically-modified door panel 410, and each of extended locking plungers 482,484, associated with specifically-modified door panel 470, may be driven substantially vertically, each to engage cooperating reinforced rod pockets in respectively the floor 430 and the header 440. When rotated into its locking position as shown in FIG. 4, locking bolt 456 associated with specifically-modified door panel 410 may be driven substantially horizontally into an accommodating receptacle in a facing edge of specifically-modified door panel 470.

In embodiments, the pair of the specifically-modified door panels 410,470 may incorporate ballistic materials in a manner that will be discussed in greater detail below with reference to, for example, FIG. 5. In operation, such specifically-modified door panels will generally be kept in a normally closed yet unlocked condition. On detecting and localizing a triggering event, as will be discussed in greater detail below, an actuating signal may be received by each of the electric door lock devices 460,490 to rotate the respective rotating lock actuator plates 450,480 in a manner that causes the extended locking plungers 452,454,482,484, and the locking bolt 456 to engage the respective pockets/receptacles, thereby securely locking the doors in response to the actuating signal, which may be, as indicated, transmitted via a hard-wired connection through the respective wire channels 465,495.

Figure 5A:
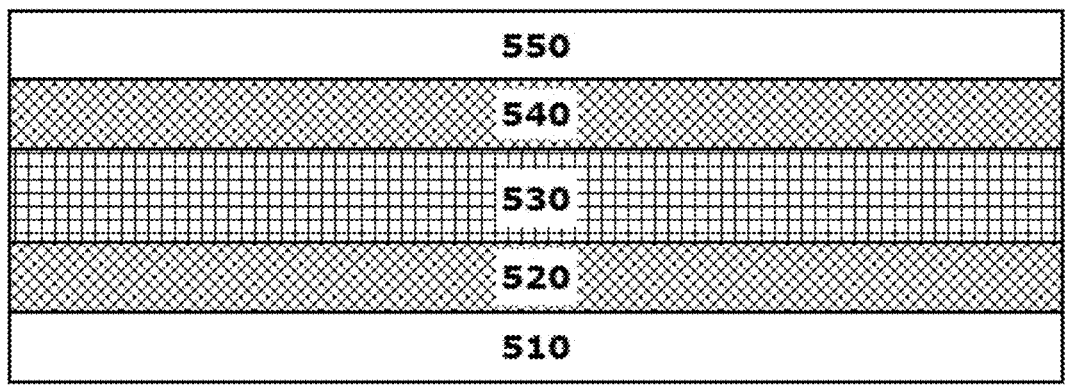
FIGS. 5A and 5B illustrate schematic diagrams of two aspects of an exemplary embodiment of an internal makeup of one or more of the doors comprising the second and third exemplary embodiments of the area segregation or active shooter interdiction systems shown in FIGS. 3 and 4, and according to this disclosure.
Figure 5B:
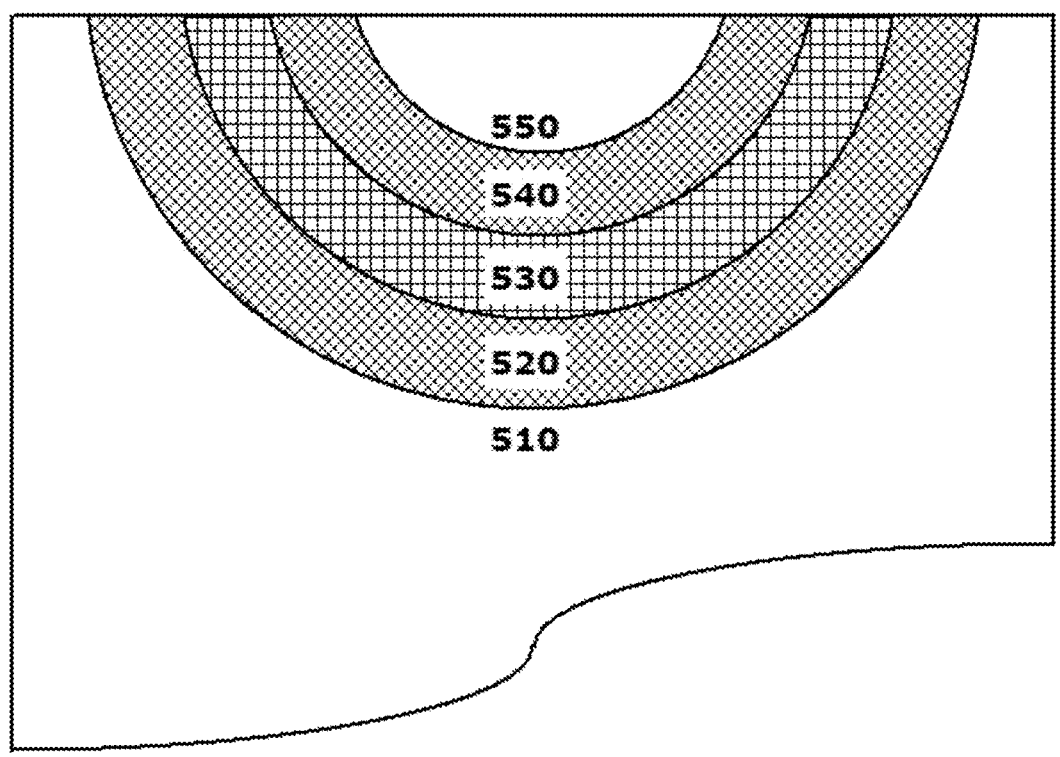

FIGS. 5A and 5B illustrate schematic diagrams of two aspects of an exemplary embodiment of an internal makeup of one or more of the doors comprising the second and third exemplary embodiments of the area segregation or active shooter interdiction systems shown in FIGS. 3 and 4, and according to this disclosure. As shown in FIG. 5A, which represents a cutaway end or edge view 500, and FIG. 5B, which represents a substantially plan form cutaway view 505 depicting various internal layers, in embodiments, the disclosed specifically-modified door panels may comprise multiple layers. These layers may, for example, comprise: an outer door veneer layer 510; a first internal ballistic material layer 520; a door core layer 530 (in which substantially all of the internal components shown above in FIGS. 3 and 4 may be housed); a second internal ballistic material layer 540; and an inner door veneer layer 550. It should be noted that this is but one example of a layered structure for one or more of the specifically-modified door panels according to this disclosure.

Figure 6:
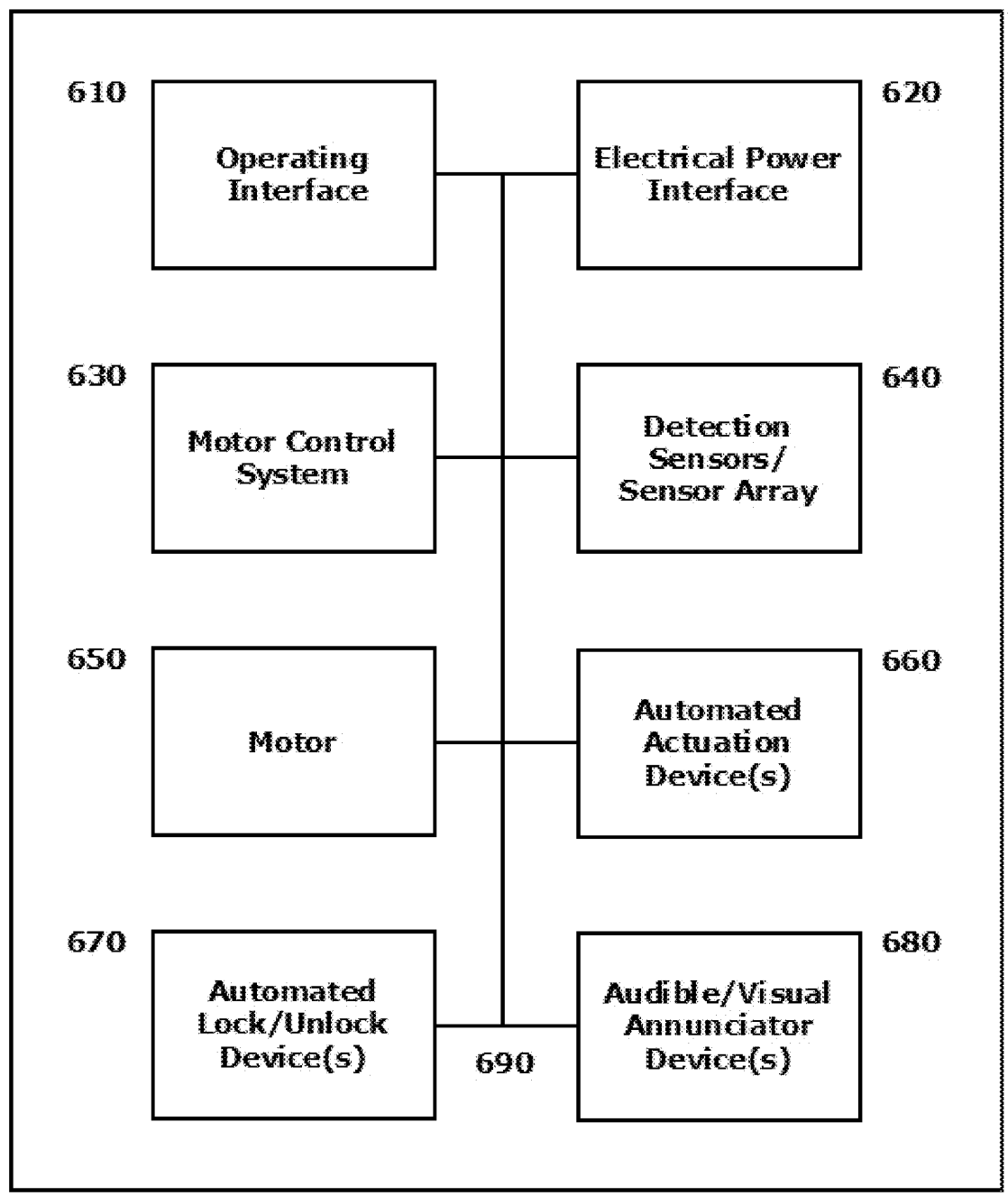
FIG. 6 illustrates a block diagram of an exemplary control system for controlling an area segregation or active shooter interdiction system according to this disclosure.

FIG. 6 illustrates a block diagram of an exemplary control system 600 for controlling an area segregation or active shooter interdiction system according to this disclosure. The exemplary control system 600 may comprise a detection and control system that may be usable to operate the exemplary combination of components or elements in order to effect the gunshot detection and isolation, and bulletproof curtain extension and retraction processes and methods, and door closure and locking processes and methods, and combinations thereof, generally described in this disclosure. Components of the exemplary detection and control system 600 may be integrated as a single unit, or may be dispersed as a series of multiple individual units as may be most appropriate to a particular installation to operate the exemplary area segregation or active shooter interdiction systems shown in exemplary manner in FIGS. 1-4, and substantially in the manner described above.

The exemplary control system 600 may include an operating interface 610. The operating interface 610 may provide one or more of a visual or audible indication that electrical power is provided to the exemplary active shooter interdiction systems, including, for example, a motor-controlled bulletproof curtain extension system, for example, through an electrical power interface 620, or otherwise. The operating interface 610 may incorporate, or otherwise may be in communication with, a motor control system 630, which may be in a form of a fully automated control system that responds to signals received via the detection sensors/sensor array 640 as interpreted by the automated actuation device 660 (1) to operate the motor 650 to extend the bulletproof curtain in the manner shown in FIGS. 1 and 2 in response to detection and localization of a gunshot through one or more sensors, according to the description provided above, and/or (2) to activate the electric/electronic door automated lock/unlock devices 670 above with respect to FIGS. 3 and 4. Separately, in concert or cooperation with the actuation of any of the other area segregation or active shooter interdiction systems described above, audible and/or visual alarms may be provided via one or more audible/visual annunciator devices 680. Each of the individually depicted components of the exemplary control system 600 may have associated with it some manner of visual, aural, or haptic feedback to a user of normal and/or abnormal operating conditions of any of the mechanical components associated with the exemplary system 600. Power and/or information data feedback communications may be provided between each of the individually-depicted components of the exemplary control system 600 via one or more power/data/control busses 690, which may be via wired or wireless communications between the various components of the control system 600.

Figure 7:
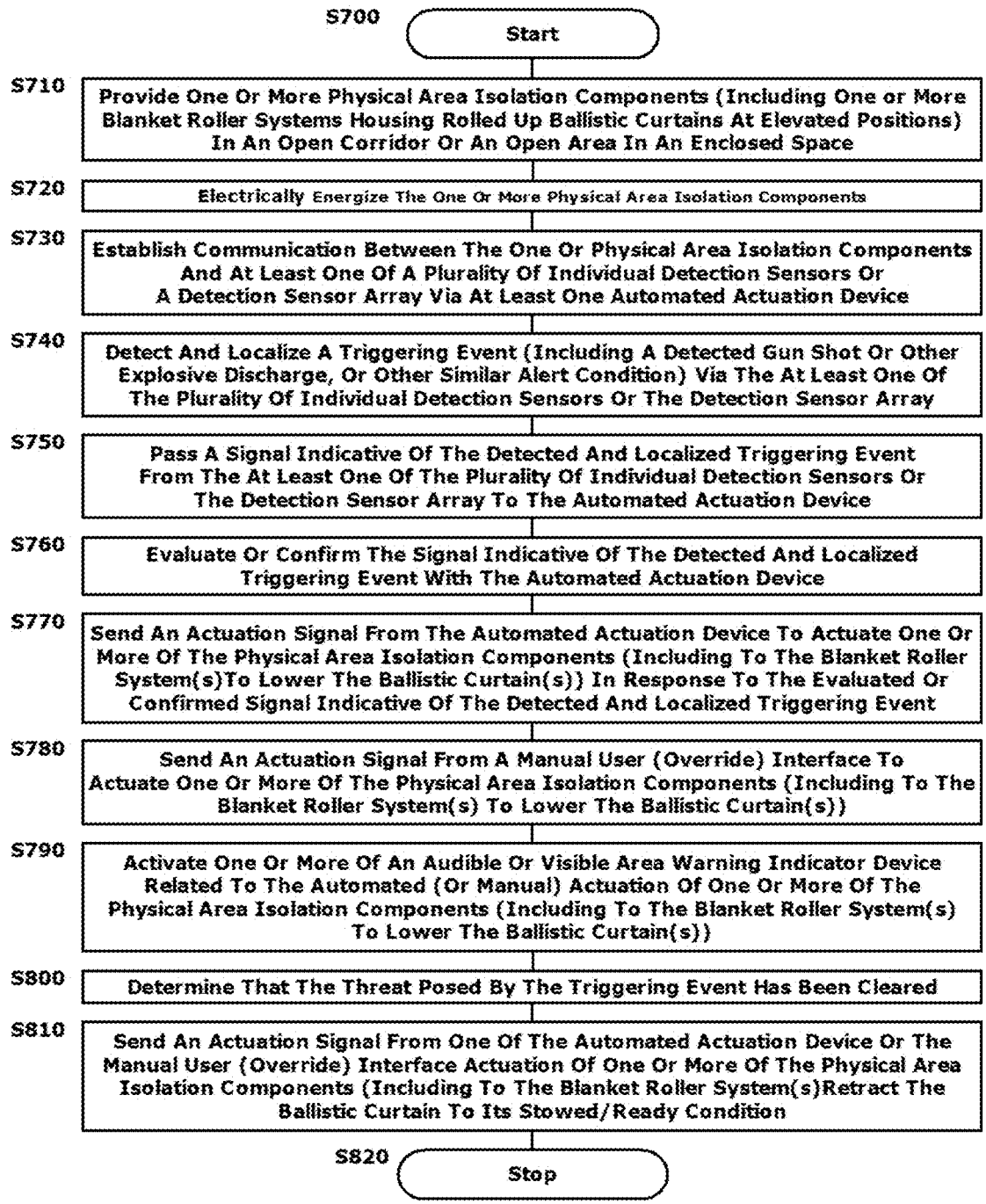
FIG. 7 illustrates a flowchart of an exemplary method for implementing an area segregation or active shooter interdiction scenario employing an area segregation or active shooter interdiction system according to this disclosure.

FIG. 7 illustrates a flowchart of an exemplary method for implementing an area segregation or active shooter interdiction scenario employing an area segregation or active shooter interdiction system according to this disclosure. As shown in FIG. 7, operation of the method commences at Step S700 and proceeds to Step S710.

In Step S710, one or more physical area isolation (or segregation) components, including one or more blanket roller systems housing rolled up ballistic curtains at elevated positions (as shown, for example, and FIGS. 1 and 2) or automatically-locking bulletproof doors, may be provided in an open corridor, or an open area within an enclosed space. Operation the method proceeds to Step S720.

In Step S720, the one or more physical area isolation (or segregation) components may be electrically energized. In this manner, the one or more physical area isolation (or segregation) components may be kept in a Standby or Ready condition. Operation the method proceeds to Step S730.

In Step S730, communications may be established between the one or more physical area isolation (or segregation) components and at least one of a plurality of individual detection sensors, or a detection sensor array, via at least one automated actuation device. Operation of the method proceeds to Step S740.

In Step S740, a triggering event, which may include a detected gunshot, or other explosive detonation, or other similar alerting conditioning, may be detected and localized via the at least one of the plurality of individual detection sensors, or the detection sensor array. Operation of the method proceeds to Step S750.

In Step S750, a signal indicative of the detected and localized triggering event from the at least one of the plurality of individual detection sensors, or the detection sensor array, may be passed to the automated actuation device. Operation of the method proceeds to Step S760.

In Step S760, the signal indicative of the detected and localized triggering event may be evaluated or confirmed with the automated actuation device. Operation of the method proceeds to Step S770.

In Step S770, an actuation signal may be sent from the automated actuation device to actuate one or more of the physical area isolation (or segregation) components, including the blanket roller systems to lower the ballistic curtains, in response to the evaluated or confirmed signal indicative of the detected and localized triggering event. Operation of the method proceeds to Step S780.

In Step S780, an actuation signal may be sent from a manual user (override) interface to actuate one or more of the physical area isolation components, including to the blanket roller system to lower the ballistic curtain. Operation of the method proceeds to Step S790.

In Step S790, one or more of an audible or visible area warning indicator devices related to the automated (or manual) actuation of the one or more of the physical area isolation (or segregation) components, including the blanket roller system to lower the ballistic curtains may be activated. Such one or more audible or visible area warning indicator devices are intended to provide individuals in an area of activation of the one or more physical area isolation (or segregation) components with additional warnings as to the conditions that precipitated the activation of the one or more physical area isolation (or segregation) components. In embodiments, the one or more of the audible or visible area warning indicator devices may remain activated for a duration of the triggering event. Operation of the method proceeds to Step S800.

In Step S800, a determination may be made that the threat posed by the triggering event has been cleared. This evaluation may be made according to automated means, or may otherwise require the evaluation of a user/administrator to reset the one or more physical area isolation (or segregation) components activated initially in response to the triggering event. Operation of the method proceeds to Step S810.

In Step S810, based on the determination made in step S800, and automated or manual actuation signal may be sent from one of the automated actuation device or the manual user (override) interface to actuate one or more the physical area isolation (or segregation) components, including the blanket roller systems, to retract the ballistic curtain to its stowed/ready condition, or to unlock ballistic doors, as appropriate. Operation of the method proceeds to Step S820, where operation of the method ceases.

The order of the flow of the steps shown in FIG. 7 provides one example of the sequence of steps that may be undertaken in an exemplary method according to this disclosure. Not all of the steps set forth in FIG. 7 need necessarily be performed to carry into effect the disclosed methods. Nor is it required that the steps of the method be carried out in the order depicted in FIG. 7, except where the performance of one of the steps represents a necessary precondition to performance of a following step. In other words, it is anticipated that the steps of the disclosed methods may be carried out in any reasonable order to effect the area isolation (or segregation) or active shooter interdiction processes according to this disclosure.

Specific reference to, for example, the above-discussed embodiments for countering active shooter and other threat scenarios in certain large, indoor areas using the disclosed powered systems for bulletproof curtain extension, and/or automated secure locking of bulletproof doors, and characteristics of the exemplary embodiments, should not be interpreted to constrain the disclosed systems, methods, techniques, schemes, processes, products or product components to only those embodiments. The depicted and described embodiments are included for non-limiting illustration of the disclosed concepts for implementing these systems, methods, techniques, processes and schemes for safer reaction to active shooters and other threat scenarios may include, but are not limited to, use of the depicted component systems, as shown. All of the above depictions and/or descriptions should, therefore, be interpreted as being exemplary only, and not limiting the disclosed schemes, in any manner.

Features and advantages of the disclosed embodiments are set forth in this disclosure and may be, at least in part, obvious from this detailed description, or may be learned by practice of the disclosed embodiments. The features and advantages of the disclosed embodiments may be realized and obtained by means of the instruments and combinations of features particularly described.

Various embodiments of the disclosed systems and methods are discussed in this disclosure. While specific implementations are discussed, it should be understood that this is done for illustration purposes only. A person skilled in the relevant art will recognize that other components and configurations may be used without departing from the spirit and scope of the disclosed embodiments.

I claim:

1. An area segregation system, comprising:
an area segregation component in a form of a curtain of a flexible material having a proximal end, a distal end and opposing lateral edges;

one or more weighted structures attached to the distal end of the area segregation component;

a roller that is configured for attachment of the proximal end of the area segregation component, the roller being further configured to store the area segregation component in a retracted configuration, and to facilitate extension of the area segregation component; and at least one motor mechanically engaged with the roller to rotate the roller to drive at least one of extension and retraction of the area segregation component, the area segregation system being configured as an integral unit for mounting at an elevated position, wherein:
the area segregation component is further configured to span between a plurality of vertical structures,
one or more of the weighted structures positioned at opposing lateral edges of the area segregation component being configured to engage cooperating portions of the at least one of the plurality of vertical structures,
the plurality of vertical structures are opposing lateral walls in a hallway between which the area segregation component is configured to span, and the cooperating portions of each of the plurality of vertical structures comprises a vertical wall mounted guide track,
a plurality of trolleys are configured to engage the opposing lateral edges of the area segregation component in a manner that the plurality of trolleys engage the vertical wall mounted guide track, and
the opposing lateral edges of the area segregation component further comprise a flexible cord sewn into each of the opposing lateral edges, and at least some of the plurality of trolleys engage the flexible cord.

2. The area segregation system of claim 1, the area segregation component being formed of one of a flexible bulletproof or ballistically resistant material.

3. The area segregation system of claim 1, the one or more weighted structures being configured to extend the area segregation component from the roller without engagement of the at least one motor.

4. The area segregation system of claim 1, further comprising a housing mounted in or above a ceiling of the hallway to house one or more of the area segregation component, the one or more weighted structures, the roller, and the at least one motor.

5. An area segregation system, comprising:
an area segregation component in a form of a curtain of a flexible material having a proximal end, a distal end and opposing lateral edges;
one or more weighted structures attached to the distal end of the area segregation component;
a roller that is configured for attachment of the proximal end of the area segregation component, the roller being further configured to store the area segregation component in a retracted configuration, and to facilitate extension of the area segregation component; and
at least one motor mechanically engaged with the roller to rotate the roller to drive at least one of extension and retraction of the area segregation component,
wherein a combination of the area segregation component, the one or more weighted structures, the roller and the at least one motor is configured as an integral unit for mounting at an elevated position;
at least one detector for detecting one or more triggering events;
a processor that is configured to
communicate with the at least one detector and the at least one motor;
at least one of analyze, isolate or localize the detected one or more triggering events based on a signal received from the at least one detector; and
send a first signal for actuation of the at least one motor to extend the area segregation component when the processor determines that the one or more triggering events is of a nature that extension of the at least one area segregation component is warranted; and
at least one of a bulletproof or ballistically resistant door including at least a remotely controllable locking device.

6. The area segregation system of claim 5, the at least one detector being at least one of a gunshot detector, an explosive detonation detector, or a contaminant dispersal detector.

7. The area segregation system of claim 5, the processor being further configured to send a second signal for actuation of the remotely controllable locking device in the at least one of a bulletproof or ballistically resistant door to a locked condition.

8. The area segregation system of claim 7, further comprising a plurality bulletproof or ballistically resistant doors, the processor being further configured to
select for actuation among one or more of the plurality of the bulletproof or ballistically resistant doors based on the at least one of the analyzing, isolating and localizing the detected one or more triggering events; and
send the second signal for actuation of the remotely controllable locking device of each of the one or more of the plurality of the bulletproof or ballistically resistant doors selected for actuation.

9. The area segregation system of claim 5, further comprising at least one of an audible warning annunciator and a visible warning annunciator,
the processor being further configured to send a third signal for actuation of the at least one of an audible warning annunciator and a visible warning annunciator based on the at least one of the analyzing, isolating and localizing the detected one or more triggering events.

10. The area segregation system of claim 5, the processor being further configured to
automatically assess that the triggering event is over;
send at least a fourth signal to retract the area segregation component when the processor determines that the one or more triggering events is over; and
send a fifth signal for actuation of the remotely controllable locking device in the at least one of the bulletproof or ballistically resistant door to an unlocked condition.

11. The area segregation system of claim 5, further comprising a manual user interface that generates a signal based on a user input that is communicated to the processor as a substitute a signal received from the at least one detector.

12. A method for area segregation, comprising:
providing:
an area segregation component in a form of a curtain of a flexible material having a proximal end, a distal end and opposing lateral edges,
one or more weighted structures attached to the distal end of the area segregation component,
a roller that is configured for attachment of the proximal end of the area segregation component, the roller being further configured to store the area segregation component in a retracted configuration, and to facilitate extension the area segregation component, at least one motor mechanically engaged with the roller to rotate the roller to drive at least one of extension and retraction of the area segregation component, and at least one of a bulletproof or ballistically resistant door including at least a remotely controllable locking device;

detecting, with at least one detector, one or more triggering events;

receiving, with a processor, a signal from the at least one detector indicating the one or more triggering events;

determining, with the processor, at least one of an analysis, isolation or localization of the detected one or more triggering events based on the signal received from the at least one detector; and sending a first signal for actuation of one or more of (1) the at least one motor to extend the area segregation component and (2) the at least the remotely controllable locking device when the processor determines that the one or more triggering events is of a nature that the actuation is warranted, the one or more triggering events being detection of at least one of a gunshot, an explosive detonation, or a contaminant dispersal.

* * * * *